Patented May 14, 1935

2,001,245

UNITED STATES PATENT OFFICE 2,001,245

MANUFACTURE OF CALCIUM SULPHATES

Orvon P. Gephart, Miamisburg, Ohio, assignor to Howard D. Meincke

No Drawing. Application March 5, 1931,
Serial No. 520,481

7 Claims. (Cl. 134—18)

The present invention relates to improvements in connection with the manufacture of calcium sulphate products and will be fully understood from the following description thereof, in which details of a specific embodiment of the invention are set forth.

In methods which have hitherto been made to utilize calcium sulphates, either in its natural, crystalline form (gypsum) or after partial or complete calcining as a filler or as a coating medium in connection with the manufacture of paper, the difficulties in dispersion of the calcium sulphate material, lack of retention by the pulp or fiber and lack of coating power have afforded serious difficulties, notwithstanding the marked advantages of the material by reason of its low cost and whiteness. As a coating material its hiding power, as hitherto prepared, has been relatively low, and when efforts have been made to incorporate it as a filler in paper, the proportion retained by the fiber and carried into the paper has been in general substantially less than 50%, say approximately 40% of the material employed.

I have now discovered that the physical structure of the calcium sulphate particles, either of the native or the partially or completely calcined material, may be markedly changed by the procedure hereinafter described, with the result of greatly increasing the dispersion of the material, and also increasing its retention in paper-making processes and its hiding power, thus adapting it for use as a filler and as a coating material in connection with paper manufacture with greatly improved results.

In accordance with my invention, I incorporate with the gypsum products small proportions of a soluble aluminum compound, preferably an aluminum sulphate or alum, and an alkaline lime compound, such as calcium carbonate, lime or hydrated lime, preferably the latter. The proportion of the soluble aluminum compound is in general less than 10% of the amount of the gypsum product and the proportion of the alkaline lime compound is so controlled that, when the composite product is incorporated in water, the resulting solution will be approximately neutral. Thus the proportion of the soluble aluminum compound may be from 5 to 20 parts by weight for each 100 parts of the calcium sulphate material and the proportion of the alkaline lime compound from 1.0 to 20.0 parts by weight. Thus a typical preparation in accordance with the present invention may be prepared by admixing thoroughly with 100 parts of finely ground natural gypsum, 8 parts by weight of alum and 2.5 parts by weight of hydrated lime.

These proportions of calcium sulphate, lime and alum can be varied to meet local conditions depending on the desired pH.

The ingredients are preferably mixed dry, the mixture being subsequently incorporated in water, although, if desired, the calcium sulphate material may be suspended in water and the aluminum compound and alkaline lime compound subsequently added. Furthermore, either the partially or completely calcined gypsum may be substituted for the natural gypsum without substantial modification of the proportions of the ingredients employed.

When the mixture is incorporated in water, a markedly improved dispersion and prolongation of the time of setting of the calcium sulphate material is noted. On examination of the particles of the calcium sulphate material removed from the suspension under a microscope, a change in the physical characteristics thereof is found to have taken place, the clean, sharp edges of the crystalline particles of the gypsum being replaced by rough, feathery edges or projections.

When the suspension thus produced is incorporated in paper pulp in a suitable mixer or feeder, it is found that the retention of the calcium sulphate material is very greatly increased, say to 65% or higher. Furthermore, the conduct of the calcium sulphate material with reference to certain sizing material, more particularly resin sizes, is found to be very greatly improved.

On incorporation of suitable casein or starch sizes with the dispersion of calcium sulphate prepared in accordance with the present invention, and the use of the resulting materials as coating materials or surface sizes in the preparation of paper, the hiding power of the calcium sulphate material is found to be very greatly increased and the whiteness of the coated paper markedly improved. All these properties contribute to better printing surfaces.

Although the present invention has been described in connection with specific details of an embodiment thereof, it is not intended that these details shall be regarded as limitations upon the scope of the invention, except in so far as included in the accompanying claims.

I claim:

1. The method of improving the dispersibility of calcium sulphates which comprises incorporating therewith small proportions of a soluble aluminum compound and an alkaline lime compound.

2. The method of increasing the dispersibility of calcium sulphates which comprises incorporating therewith small proportions of alum and an alkaline lime compound.

3. The method of increasing the dispersibility of calcium sulphates which comprises incorporating therewith from 5 to 20 parts of alum and 1 to 20 parts of hydrated lime to each 100 parts of the calcium sulphate material.

4. As a composition of matter, a mixture consisting largely of calcium sulphate and containing small proportions of a soluble aluminum compound and an alkaline lime compound.

5. As a composition of matter, a mixture consisting largely of calcium sulphate and containing small proportions of aluminum sulphate and hydrated lime.

6. As a coating material, a dispersion of calcium sulphate modified by the presence of small proportions of a soluble alum compound and hydrated lime and containing a sizing agent.

7. As a composition of matter, a mixture consisting of approximately 100 parts of calcium sulphate, 8 parts of alum and 2.5 parts of hydrated lime.

ORVON P. GEPHART.